US011370526B2

(12) United States Patent
Lorenz

(10) Patent No.: US 11,370,526 B2
(45) Date of Patent: Jun. 28, 2022

(54) LATCHING DEVICE FOR A WING ARRANGEMENT FOR AN AIRCRAFT

(71) Applicant: Airbus Operations GmbH, Hamburg (DE)

(72) Inventor: Christian Lorenz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 322 days.

(21) Appl. No.: 16/426,538

(22) Filed: May 30, 2019

(65) Prior Publication Data

US 2019/0389559 A1   Dec. 26, 2019

(30) Foreign Application Priority Data

May 31, 2018  (DE) .......................... 102018113080.5

(51) Int. Cl.
*B64C 3/56*   (2006.01)
*B64C 13/28*   (2006.01)

(52) U.S. Cl.
CPC ................ *B64C 3/56* (2013.01); *B64C 13/28* (2013.01)

(58) Field of Classification Search
CPC .. B64C 13/28; B64C 3/56; B64C 3/54; B64C 1/30; B64C 3/00; B64C 3/42; B64C 5/08; B64C 5/10; B64C 23/65; B64C 23/72; Y02T 50/30; Y02T 50/10
See application file for complete search history.

(56) References Cited

U.S. PATENT DOCUMENTS

| 262,451 | A | * | 8/1882 | McFarlane | B62D 7/023 |
| | | | | | 280/137.504 |
| 1,348,374 | A | * | 8/1920 | Plym | B64C 3/00 |
| | | | | | 244/123.8 |
| 1,779,113 | A | * | 10/1930 | Carns | B64C 9/00 |
| | | | | | 244/123.9 |
| 1,803,030 | A | * | 4/1931 | Messerschmitt | B64C 3/00 |
| | | | | | 244/123.8 |

(Continued)

FOREIGN PATENT DOCUMENTS

| EP | 2 727 828 | 5/2014 |
| EP | 3 069 988 | 9/2016 |
| EP | 3 121 116 | 1/2017 |

OTHER PUBLICATIONS

Search Report for DE 10 2018 113 080.5, dated Feb. 5, 2019, 7 pages.

*Primary Examiner* — Medhat Badawi
(74) *Attorney, Agent, or Firm* — Nixon & Vanderhye P.C.

(57) ABSTRACT

A latching device for a wing (3) including a base (11) and a tip section (13). There is a first bore (27) extending from the base section (11) and a second bore (27) extending from the tip section (13) wherein the bores are aligned when the tip section is deployed for flight and out of alignment when the tip section (13) is folded. The latching device (29) includes a housing (33) with an interior cavity (35), a spindle (39) in the interior cavity, a nut (47) threaded on the spindle, wherein rotation of the spindle causes; a latching bolt (31) coupled to the nut (47) and being moved as the nut moves along the rotating spindle between retracted and extended positions; a guide (49) to guide the nut (47) along the spindle and of the latching bolt between the retracted position and the extended position, and a latch actuator (41).

16 Claims, 5 Drawing Sheets

(56) References Cited

U.S. PATENT DOCUMENTS

| | | | | |
|---|---|---|---|---|
| 1,804,823 A * | 5/1931 | Blondin | B64C 3/00 | 244/123.1 |
| 1,806,586 A * | 5/1931 | Christmas | B64C 3/00 | 244/123.4 |
| 1,819,794 A * | 8/1931 | Schultze | B64C 3/56 | 244/49 |
| 1,956,823 A * | 5/1934 | Edmundb | B64C 3/00 | 244/123.4 |
| 2,222,997 A * | 11/1940 | Bellanca | B64C 3/54 | 244/90 R |
| 2,289,224 A * | 7/1942 | Anderson | B64C 3/56 | 244/49 |
| 2,292,613 A * | 8/1942 | Frederick | B64C 3/54 | 244/218 |
| 2,375,075 A * | 5/1945 | Carruth | B64D 47/06 | 362/470 |
| 2,420,433 A * | 5/1947 | Kraaymes | B64C 3/54 | 244/218 |
| 2,468,425 A * | 4/1949 | Carpenter | B64C 3/56 | 74/520 |
| 2,712,421 A * | 7/1955 | Naumann | B64C 3/56 | 244/49 |
| 2,719,682 A * | 10/1955 | Handel | B64C 3/56 | 244/49 |
| 2,881,989 A * | 4/1959 | Flettner | B64C 27/26 | 244/6 |
| 2,881,994 A * | 4/1959 | Michael | B64C 3/26 | 244/124 |
| 3,039,721 A * | 6/1962 | Rogers, Jr. | B64D 37/04 | 244/135 R |
| 3,139,248 A * | 6/1964 | Alvarez-Calderon | B64C 3/42 | 244/207 |
| 3,333,792 A * | 8/1967 | Alvarez-Calderon | B64C 3/54 | 244/218 |
| 3,645,477 A * | 2/1972 | Kratschmar | B64C 3/40 | 244/46 |
| 3,737,121 A * | 6/1973 | Jones | B64C 3/40 | 244/13 |
| 4,061,195 A * | 12/1977 | Pryor | A01B 73/044 | 172/456 |
| 4,228,977 A * | 10/1980 | Tanaka | A63H 27/08 | 244/153 R |
| 4,245,804 A * | 1/1981 | Ishimitsu | B64C 23/069 | 244/91 |
| 4,247,062 A * | 1/1981 | Brueckner | B64C 5/08 | 244/36 |
| 4,247,063 A * | 1/1981 | Jenkins | B64C 5/08 | 244/91 |
| 4,457,479 A * | 7/1984 | Daude | B64C 5/08 | 244/203 |
| 4,497,461 A * | 2/1985 | Campbell | B64C 9/00 | 244/99.3 |
| 4,598,885 A * | 7/1986 | Waitzman | B64C 23/076 | 244/13 |
| 4,671,470 A * | 6/1987 | Jonas | B29C 66/54 | 244/119 |
| 4,671,473 A * | 6/1987 | Goodson | B64C 23/076 | 244/199.4 |
| 4,717,093 A * | 1/1988 | Rosenberger | F42B 10/16 | 244/49 |
| 4,722,499 A * | 2/1988 | Klug | B64C 23/076 | 244/199.4 |
| 4,824,053 A * | 4/1989 | Sarh | B23Q 1/601 | 244/218 |
| 4,881,700 A * | 11/1989 | Sarh | B60F 5/02 | 244/2 |
| 4,986,493 A * | 1/1991 | Sarh | B60F 5/02 | 244/2 |
| 5,040,747 A * | 8/1991 | Kane | B64C 25/26 | 244/102 R |
| 5,072,894 A * | 12/1991 | Cichy | B64C 5/08 | 244/91 |
| 5,201,479 A * | 4/1993 | Renzelmann | B64C 3/56 | 244/49 |
| 5,229,921 A * | 7/1993 | Bohmer | G06F 1/1679 | 16/324 |
| 5,288,037 A * | 2/1994 | Derrien | B64C 25/26 | 244/102 SL |
| 5,288,039 A * | 2/1994 | DeLaurier | B64C 33/02 | 244/219 |
| 5,310,138 A * | 5/1994 | Fitzgibbon | B64C 3/56 | 244/49 |
| 5,348,253 A * | 9/1994 | Gratzer | B64C 23/069 | 244/91 |
| 5,350,135 A * | 9/1994 | Renzelmann | B64C 3/56 | 244/49 |
| 5,356,094 A * | 10/1994 | Sylvain | B64C 3/56 | 244/123.9 |
| 5,379,969 A * | 1/1995 | Marx | B64C 3/56 | 244/49 |
| 5,381,986 A * | 1/1995 | Smith | B64C 3/56 | 244/49 |
| 5,407,153 A * | 4/1995 | Kirk | B64C 23/069 | 244/199.4 |
| 5,427,329 A * | 6/1995 | Renzelmann | B64C 3/56 | 244/49 |
| 5,558,299 A * | 9/1996 | Veile | B64C 3/56 | 244/49 |
| 5,645,250 A * | 7/1997 | Gevers | B64D 27/00 | 244/101 |
| 5,988,563 A * | 11/1999 | Allen | B64C 3/56 | 244/49 |
| 6,076,766 A * | 6/2000 | Gruensfelder | B64C 3/56 | 244/130 |
| 6,190,484 B1 * | 2/2001 | Appa | B29C 70/32 | 156/189 |
| 6,224,012 B1 * | 5/2001 | Wooley | B60F 5/02 | 244/121 |
| 6,227,487 B1 * | 5/2001 | Clark | B64C 23/072 | 244/99.12 |
| 6,260,799 B1 * | 7/2001 | Russ | B64C 3/56 | 244/49 |
| 6,345,790 B1 * | 2/2002 | Brix | B64C 23/076 | 244/199.4 |
| 6,834,835 B1 * | 12/2004 | Knowles | B64C 3/54 | 244/198 |
| 7,137,589 B2 * | 11/2006 | Arata | B64C 27/26 | 244/6 |
| 7,497,403 B2 * | 3/2009 | McCarthy | B64C 23/072 | 244/199.4 |
| 8,089,034 B2 * | 1/2012 | Hammerquist | B64C 3/56 | 244/3.28 |
| 8,276,842 B2 * | 10/2012 | Kracke | B64C 13/28 | 244/99.4 |
| 8,651,431 B1 * | 2/2014 | White | B64C 23/076 | 244/218 |
| 8,733,692 B2 * | 5/2014 | Kordel | B64C 23/072 | 244/49 |
| 8,777,153 B2 * | 7/2014 | Parker | B64C 3/56 | 244/49 |
| 8,919,703 B2 * | 12/2014 | Parker | B64C 7/00 | 244/215 |
| 8,998,132 B2 * | 4/2015 | Burris | B64C 9/04 | 244/99.3 |
| 9,162,755 B2 * | 10/2015 | Guida | B64C 23/069 | |
| 9,211,946 B2 * | 12/2015 | Good | B64C 3/56 | |
| 9,296,469 B2 * | 3/2016 | Santini | B64C 3/56 | |
| 9,415,857 B2 * | 8/2016 | Fox | B64C 3/56 | |
| 9,469,391 B1 * | 10/2016 | Dong | B64C 23/076 | |
| 9,469,392 B2 * | 10/2016 | Fox | B64C 23/072 | |
| 9,701,392 B2 * | 7/2017 | Whitlock | B64C 3/26 | |
| 9,896,186 B2 * | 2/2018 | Fong | B29C 70/222 | |
| 9,908,612 B2 * | 3/2018 | Fox | B64C 3/56 | |
| 9,914,523 B2 * | 3/2018 | Good | B64C 3/56 | |
| 10,189,557 B2 * | 1/2019 | Boye | B64C 3/56 | |
| 10,227,128 B2 * | 3/2019 | Korya | B64C 3/56 | |
| 10,501,167 B2 * | 12/2019 | Kracke | B64C 3/56 | |
| 11,066,148 B2 * | 7/2021 | Elenbaas | B64C 13/34 | |

(56) References Cited

U.S. PATENT DOCUMENTS

| | | | |
|---|---|---|---|
| 2003/0155839 A1* | 8/2003 | Krimmer | H01F 7/1607 310/264 |
| 2004/0000619 A1* | 1/2004 | Barriety | B64C 3/52 244/219 |
| 2004/0262451 A1* | 12/2004 | McLean | B64C 3/10 244/45 R |
| 2005/0133672 A1* | 6/2005 | Irving | B64C 23/072 244/201 |
| 2005/0230531 A1* | 10/2005 | Horinouchi | B64C 3/40 244/47 |
| 2005/0276657 A1* | 12/2005 | Yumikino | A61F 5/0125 403/92 |
| 2007/0262207 A1* | 11/2007 | Morgenstern | B64C 9/22 244/214 |
| 2008/0191099 A1* | 8/2008 | Werthmann | B64C 23/065 244/199.4 |
| 2008/0308683 A1* | 12/2008 | Sankrithi | B64C 23/076 244/199.4 |
| 2009/0148302 A1* | 6/2009 | Leahy | B64C 27/463 416/224 |
| 2009/0166477 A1* | 7/2009 | Bousfield | B64C 3/18 244/218 |
| 2009/0224107 A1* | 9/2009 | McLean | B64C 23/069 244/199.4 |
| 2009/0302151 A1* | 12/2009 | Holmes | B64C 3/56 244/49 |
| 2010/0019080 A1* | 1/2010 | Schweighart | B64C 3/56 244/49 |
| 2010/0051742 A1* | 3/2010 | Schweighart | B64C 3/56 244/49 |
| 2010/0084516 A1* | 4/2010 | Eberhardt | B64C 23/072 244/218 |
| 2011/0180657 A1* | 7/2011 | Gionta | B64C 3/56 244/49 |
| 2012/0032023 A1* | 2/2012 | Bousfield | B64C 3/56 244/49 |
| 2012/0112005 A1* | 5/2012 | Chaussee | B64C 23/072 244/123.1 |
| 2012/0292436 A1* | 11/2012 | Karem | B64C 3/56 244/49 |
| 2013/0001367 A1* | 1/2013 | Boer | B64C 23/072 244/199.3 |
| 2013/0056579 A1* | 3/2013 | Schlipf | B64C 3/56 244/49 |
| 2013/0099060 A1* | 4/2013 | Dees | B64C 3/56 244/199.4 |
| 2014/0014768 A1* | 1/2014 | Lassen | B64C 3/56 244/49 |
| 2014/0361539 A1* | 12/2014 | Carter | F03D 7/06 290/44 |
| 2015/0014478 A1* | 1/2015 | Lassen | B64C 3/56 244/49 |
| 2015/0097087 A1* | 4/2015 | Sakurai | B64C 3/40 244/201 |
| 2015/0191243 A1* | 7/2015 | Fujimoto | B64C 3/56 244/7 R |
| 2015/0210390 A1* | 7/2015 | Gad | B64D 1/12 244/137.3 |
| 2016/0090170 A1* | 3/2016 | Thompson | B64C 3/56 701/3 |
| 2016/0185444 A1* | 6/2016 | Gionta | B64C 3/56 244/49 |
| 2016/0244145 A1* | 8/2016 | Thompson | B64C 23/072 |
| 2016/0251075 A1* | 9/2016 | Thompson | B64C 23/072 244/198 |
| 2016/0332723 A1* | 11/2016 | Korya | B64C 17/00 |
| 2016/0362171 A1* | 12/2016 | Lassen | B64C 3/56 |
| 2017/0029089 A1* | 2/2017 | Alexander | B64C 3/40 |
| 2017/0043864 A1* | 2/2017 | Axford | B64C 3/56 |
| 2017/0137110 A1 | 5/2017 | Harding et al. | |
| 2017/0349296 A1* | 12/2017 | Moy | B64C 3/56 |
| 2017/0355438 A1* | 12/2017 | Bishop | B64C 3/56 |
| 2017/0355444 A1* | 12/2017 | Lorenz | B64C 3/56 |
| 2018/0057144 A1* | 3/2018 | Lorenz | B64C 3/56 |
| 2018/0237127 A1* | 8/2018 | Hewson | B64C 3/187 |
| 2019/0152578 A1* | 5/2019 | Dege | G06F 30/20 |
| 2019/0152579 A1* | 5/2019 | Dege | B64C 3/56 |
| 2019/0152580 A1* | 5/2019 | Dege | B64C 3/56 |
| 2019/0152624 A1* | 5/2019 | Dege | G06F 17/00 |
| 2019/0248468 A1* | 8/2019 | Lorenz | B64C 3/56 |
| 2019/0322351 A1* | 10/2019 | Lorenz | F16D 55/38 |
| 2019/0337605 A1* | 11/2019 | Lorenz | B64C 3/56 |
| 2019/0359311 A1* | 11/2019 | Lorenz | B64C 3/56 |
| 2019/0359312 A1* | 11/2019 | Lorenz | B64C 3/56 |
| 2019/0367154 A1* | 12/2019 | Weder | B64C 3/56 |
| 2019/0367155 A1* | 12/2019 | Dege | B64C 3/56 |
| 2019/0389559 A1* | 12/2019 | Lorenz | B64C 3/56 |
| 2020/0023938 A1* | 1/2020 | Dege | B64C 3/56 |
| 2020/0398969 A1* | 12/2020 | Lorenz | B64C 3/56 |

* cited by examiner

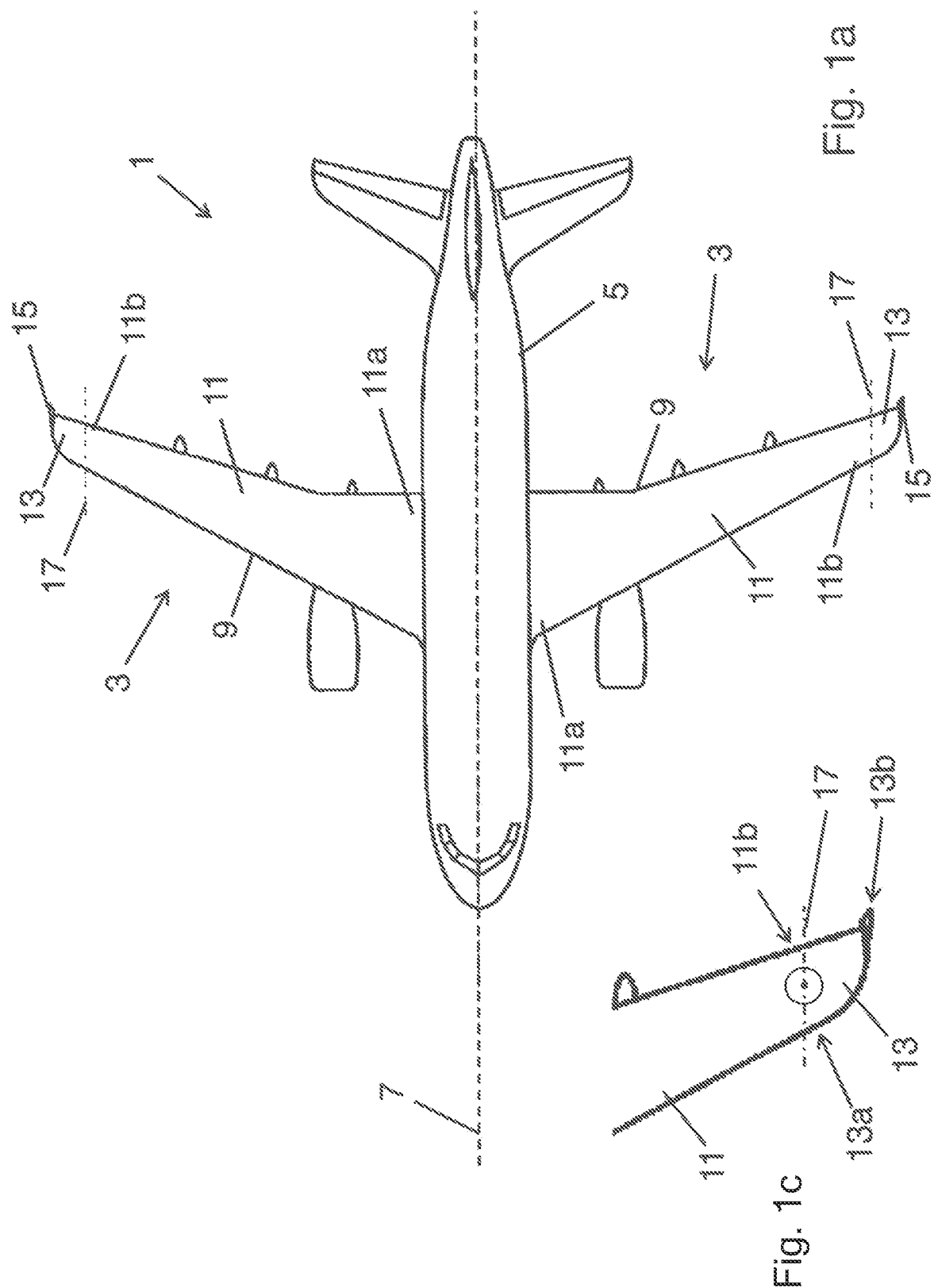

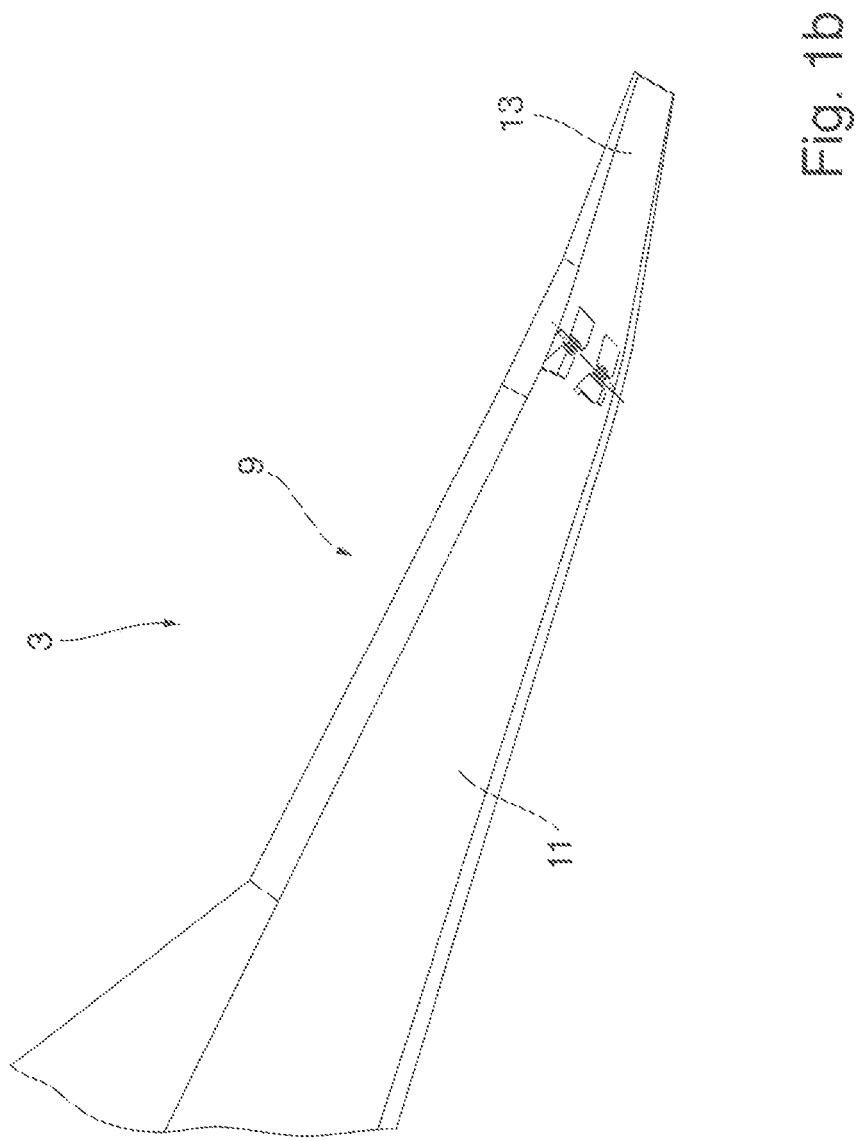

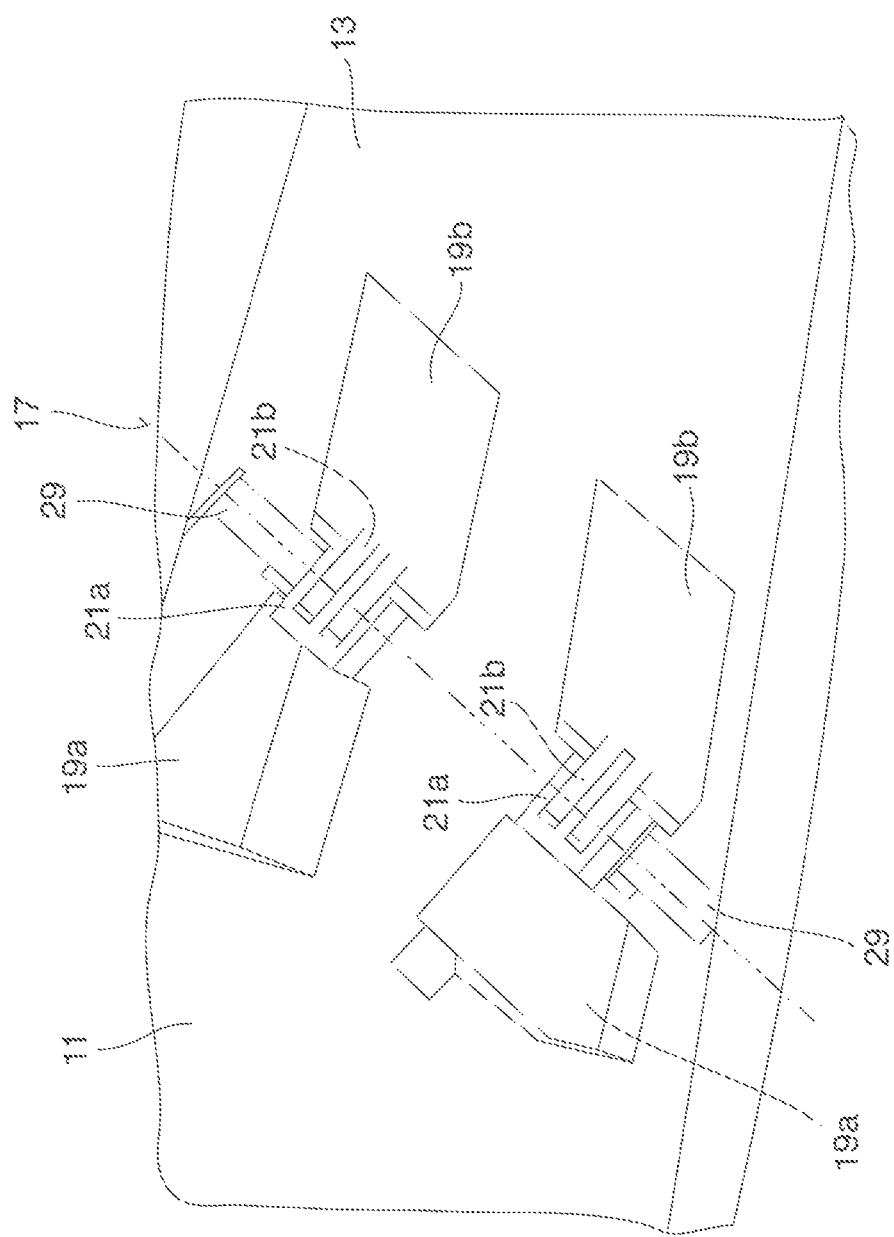

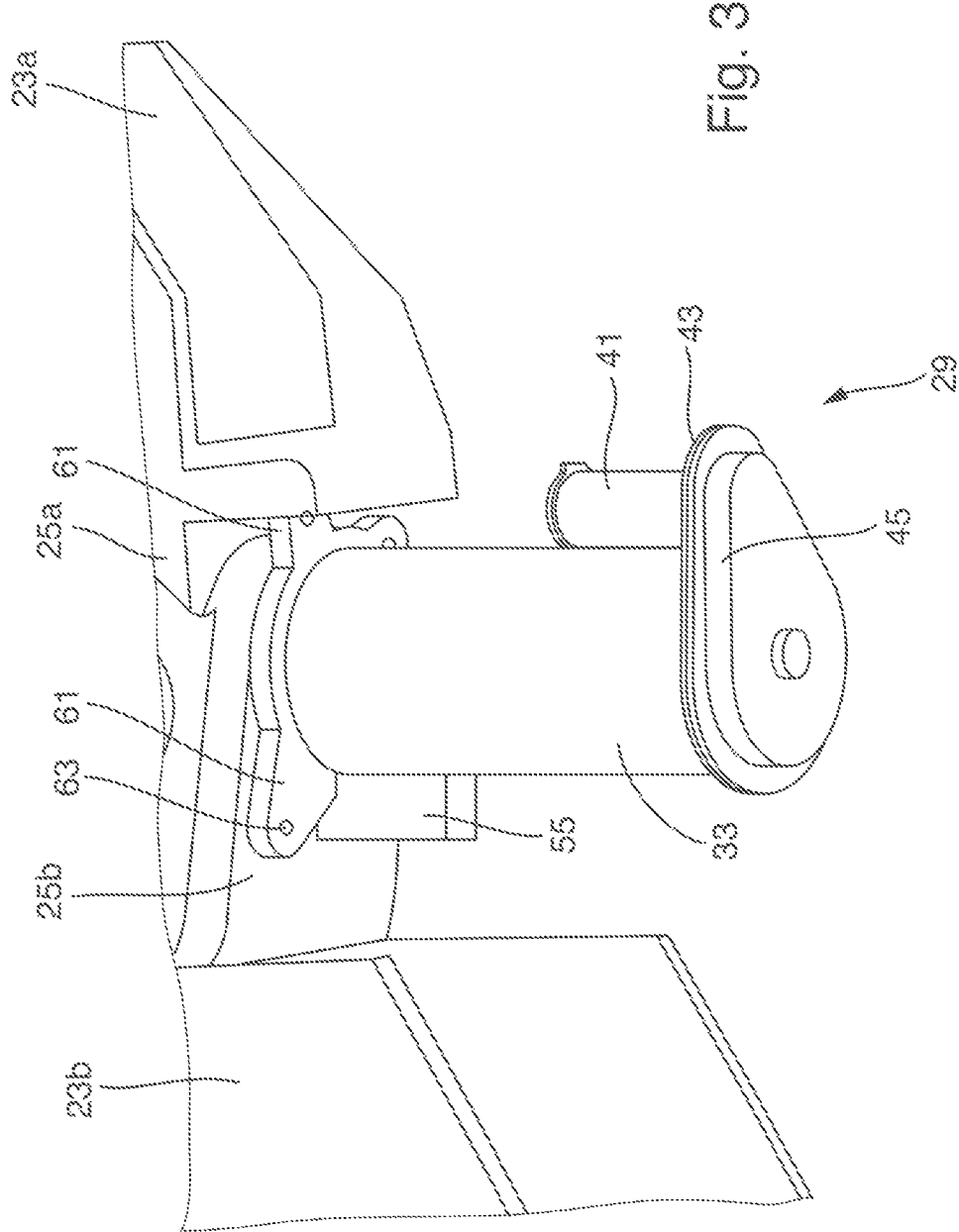

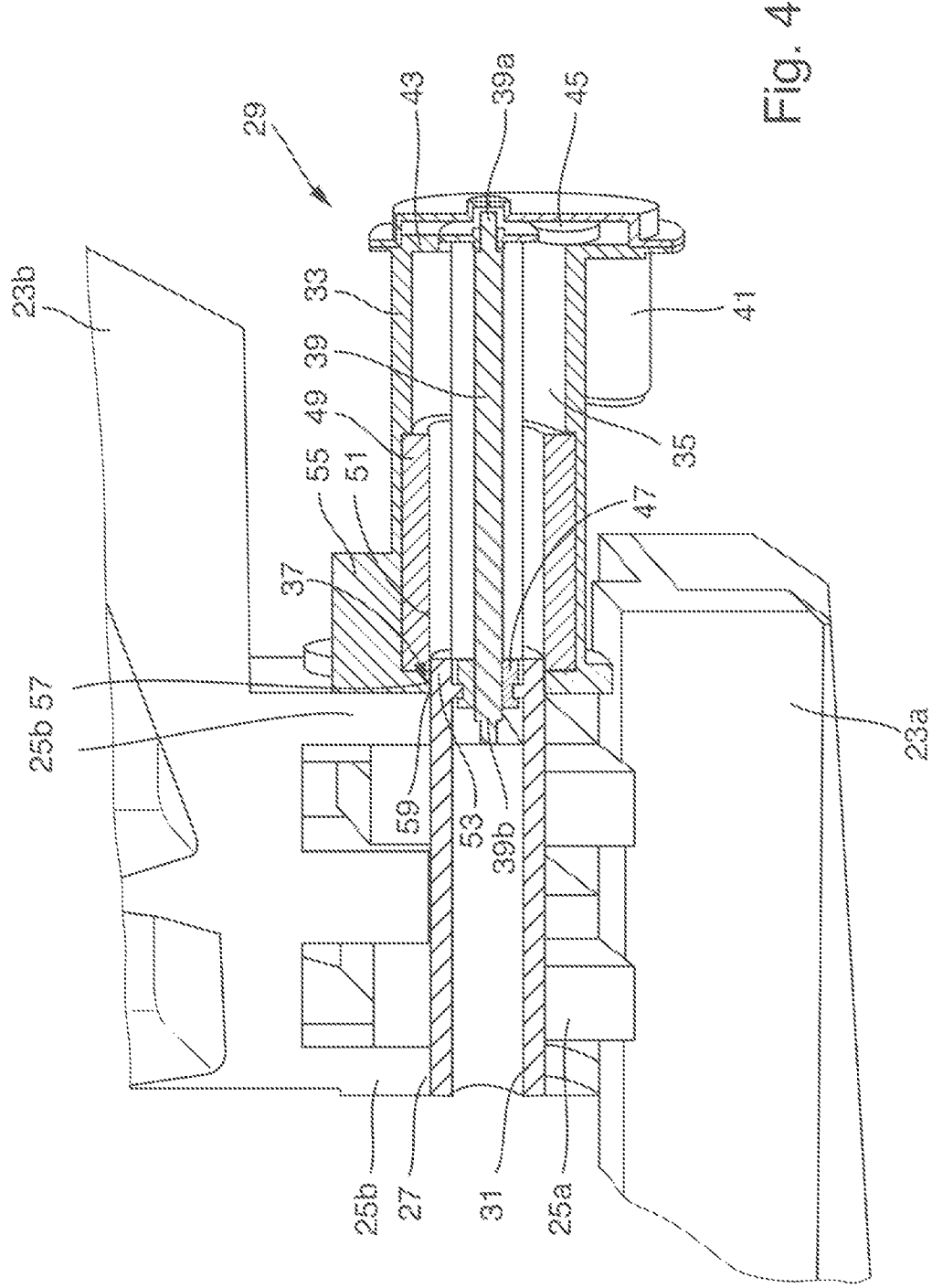

LATCHING DEVICE FOR A WING ARRANGEMENT FOR AN AIRCRAFT

RELATED APPLICATION

This application claims priority to German Patent Application DE 10 2018 113 080.5, filed May 31, 2018, the entirety of which is incorporated by reference.

FIELD OF THE INVENTION

The present invention relates a latching device for a wing arrangement for an aircraft, which wing arrangement includes a wing comprising a base section having a first end portion adapted to be secured to the fuselage of an aircraft and an opposite second end portion, and a tip section having a third end portion and an opposite fourth end portion, wherein the third end portion is pivotably connected to the second end portion such that the tip section is pivotable about a pivot axis between a deployed position and a stowed position in which the spanwise length of the wing is smaller than in the deployed position.

BACKGROUND AND SUMMARY OF THE INVENTION

The aspect ratio, i.e. the ratio of span to chord, of an aircraft wing is one factor influencing the efficiency of the aircraft during flight. Generally, an increase of the aspect ratio is associated with an increased efficiency during steady flight. Therefore, an increase of the wingspan of an aircraft is one factor to take into consideration when seeking to reduce fuel consumption. However, when elongating the wing of an existing family of aircraft, it may become necessary to adapt the aircraft family specific infrastructure, and airport fees may increase.

One possibility to increase the wingspan without having to adapt the aircraft family specific infrastructure and having to deal with increased airport fees, or to reduce airport fees for existing aircraft is to provide for a foldable wing construction which allows to pivotably move an outboard end portion of the wing between a deployed position, in which the wing has its normal flight configuration, and a stowed position, in which the wing has a folded configuration and the wingspan is decreased as compared to the deployed position. It is necessary to provide a latching device which is able to safely retain the outboard end portion in the deployed position as long as this position is desired.

The present invention may be embodied to provide a latching device for a wing arrangement having a foldable wing, which latching device is safe and reliable in operation and at the same time of a simple construction and provides for simple installation, maintenance and replacement.

The wing arrangement may comprise a wing having a base section and a tip section. The base section has a first end portion, which is adapted to be secured to the fuselage of an aircraft, and an opposite second end portion. Thus, when the wing is mounted to a fuselage of an aircraft at its first end portion the second end portion of the base section is remote from the fuselage, i.e., a terminal end of the first end portion constitutes the inboard end of the base section and of the entire wing and an opposite terminal end of the second end portion constitutes the outboard end of the base section.

The tip section has a third end portion and an opposite fourth end portion. The third end portion is pivotably connected to the second end portion such that the tip section is pivotable about a pivot axis between a deployed position and a stowed position in which the spanwise length of the wing is smaller than in the deployed position. In other words, when two of the wings are mounted to opposite sides of a fuselage of an aircraft, the length of the shortest straight line between the outermost wingtips of the two wings is larger—and may be maximized—in the deployed position than in the stowed position. In particular, the distance between the first end portion and the fourth end portion may be larger—and may be maximized—in the deployed position than in the stowed position.

The pivot axis is may be oriented in a direction extending between a first edge and a second edge of the wing opposite to each other in a chord direction of the wing, and may be in a or the local chord direction and/or in a flight direction of an aircraft to which the wing arrangement is mounted. Thus, when moving the tip section from the deployed position into the folded position, the tip section is pivoted downwardly or upwardly with respect to the base section. Alternatively, the pivot axis may be oriented in a vertical direction and/or in a wing depth direction and/or in a direction transverse or perpendicular to the wing surface. In that case, when moving the tip section from the deployed position into the folded position, the tip section is pivoted forwardly or rearwardly with respect to the base section.

Thus, when the wing is mounted to a fuselage of an aircraft at its first end portion, and at least in the deployed position of the tip section, the third end portion of the tip section is spaced from the fuselage by the base section and the fourth end portion is the outermost portion of the wing, i.e., a terminal end of the third end portion constitutes the inboard end of the tip section and an opposite terminal end of the fourth end portion constitutes the outboard end of the tip section and of the entire wing.

It is to be noted that, in case the wing includes a wing tip device, the tip section may be identical to the wing tip de-vice, but that it is that the tip section comprises the wing tip device and additionally a further portion of the wing at the inboard side of the wing tip device. In this regard, in the usual manner wing tip devices are understood as devices or wing sections installed at the outermost end of a wing and being adapted to increase the effective aspect ratio of a wing without materially increasing the wingspan and to reduce drag by partially recovering the energy of tip vortices.

The wing arrangement further comprises a first engagement portion having a first bore and extending from the base section at the second end portion and a second engagement portion having a second bore and extending from the tip section at the third end portion, such that when the tip section is in the deployed position the first and second bores are aligned and when the tip section is in the folded position the first and second bores are out of alignment. Consequently, in the deployed position the first and second bores effectively constitute a single bore through which a latching bolt can be inserted, thereby engaging both the first engagement portion and the second engagement portion and preventing movement of the tip section out of the deployed position. For this purpose, the latching device is of the following configuration.

The latching device comprises a housing or casing comprising an interior cavity and an opening at which the interior cavity is open towards an exterior of the housing.

The latching device further comprises an elongate straight spindle which is externally threaded, i.e. has an external thread on an outer circumferential surface thereof. The spindle is supported in the interior cavity such that it is rotatable with respect to the housing about a longitudinal axis of the spindle and is secured against axial movement with respect to the housing, i.e. it cannot move in the axial direction with respect to the housing. It is further that the spindle is also supported against radial movement with respect to the housing. However, it is possible to support the spindle at two locations spaced in the longitudinal direction such that some radial movement of the in the alternative it is that the ends of the spindle are capable of some radial movement of the opposite end portions of the spindle with respect to the housing is possible.

The latching device also comprises a nut, which is internally threaded and which is threaded onto the spindle and supported in the housing such that rotation of the nut with respect to the housing is prevented and rotation of the spindle causes the nut to move along the spindle, more specifically along the longitudinal axis of the spindle.

Moreover, the latching device comprises a latching bolt having a longitudinal axis and coupled at one of its end portions to the nut and being slidably supported in the housing in such a manner that the latching bolt is selectively movable along the longitudinal axis of the spindle between a retracted position and an extended position by moving the nut along the spindle, i.e. by rotating the spindle in the corresponding direction. In the extended position the latching bolt extends further through the opening to the exterior of the housing than in the retracted position. Thus, the latching bolt is supported on or by the housing or casing and is received at least partially in the interior cavity. In the retracted position it may be retracted entirely into the housing, i.e. does not project at all outside the opening.

In addition, the latching device also comprises a guide, which is adapted to guide the movement of the nut along the spindle and of the latching bolt between the retracted position and the extended position. The guide may be arranged in the interior cavity as a separate component connected to the housing or may be integrally formed with and as part of the housing and define the interior cavity or at least a portion thereof. For example, the guide may comprise a portion in the form of a hollow cylinder. For improving the guiding of the latching bolt, the guide may comprise, e.g., a linear bearing and, in particular, a linear ball bearing.

Furthermore, the latching device comprises a latch actuator which is adapted to effect rotation of the spindle about the longitudinal axis and, thereby, via the nut, movement of the latching bolt between the extended and retracted positions. For this purpose, the latch actuator is drivingly coupled to the spindle.

The above-described latching device is of a simple construction and is nevertheless capable of providing for reliable latching in the deployed position a tip section of a wing arrangement of the type likewise already described above. The latching device further provides for simple installation, maintenance and replacement, because the latching device can easily be installed as a unit on the wing, such that by moving the latching bolt from the retracted position into the extended position the latching bolt is inserted through the bore constituted by the first and second bores of the first and second engagement portions of the wing arrangement when tip section is in the deployed position, thereby engaging both the first engagement portion and the second engagement portion and preventing movement of the tip section out of the deployed position, as already described above. Installation as a unit facilitates precise positioning of the latching device, so that installation time and effort can be reduced. Similarly, in case of maintenance or replacement, removing the latching device from the wing arrangement is also very simple.

In an embodiment, the nut is a ball nut. By means of this configuration of the nut it is possible to provide for a coupling between the latching bolt and the spindle effectively constituting a universal joint, so that even in case of slight misalignments of the longitudinal axes of the spindle and the latching bolt, the latching bolt can be reliably moved between the extended and retracted positons while having a predetermined orientation of its longitudinal axis. Alternatively or additionally it is also if the latch actuator is drivingly coupled to the spindle via a universal joint.

In an embodiment, the latching bolt is releasably coupled to the nut. This facilitates maintenance because the latching bolt can be easily removed and replaced. For example, the releasable coupling between the nut and the latching bolt may be a threaded connection, e.g. the latching bolt may be threaded onto a portion of the nut. Alternatively or additionally, the latching bolt is rigidly coupled to the nut, i.e. such that rotation of the latching bolt with respect to the nut during normal operation is prevented. Nevertheless, in case of a threaded releasable coupling between the nut and the latching bolt, it is possible to rotate the latching bolt with respect to the nut for purposes of removing the latching bolt from the nut.

In an embodiment, the latching bolt is a hollow cylinder.

In an embodiment, at least a portion of the guide is a hollow cylinder. The latching bolt and the nut are then in contact with an interior surface of the guide. This interior surface may be provided, e.g., at least in part by a linear bearing and, in particular, a linear ball bearing, as already mentioned above.

In an embodiment, the nut comprises one of a slot and a radial projection and the guide comprises the other one of the slot and the radial projection. In any case, the slot and the radial projection engage each other and are configured to thereby prevent relative rotation between the nut and the housing and to guide the movement of the nut along the spindle. For example, if the slot is provided in the housing, the slot may be elongate and extend along the length or at least a part of the length of the guide, i.e. in the longitudinal direction of the spindle. Moreover, two or more of such slots and two or more of such projections may be provided, wherein each of the slots is engaged by at least one of the projections.

In an embodiment, the latch actuator is or comprises an electric actuator, such as an electric motor, hydraulic actuator, such as a linear hydraulic actuator, or a pneumatic actuator.

Generally the latch actuator may be a rotary actuator. In any case, the latch actuator may be arranged outside the housing and may be drivingly connected to the spindle by a transmission, such as, e.g., an offset transmission and/or a planar transmission.

In an embodiment, the latching device further comprises one or more locking mechanisms—and possibly two or more for reasons of redundancy—each having a locking element which is selectively movable between a locking position and an enabling position. Each such locking mechanism and the corresponding locking element are configured and arranged such that when the latching bolt is in the extended position and the locking element is moved from the enabling position to the locking position the locking element engages the latching bolt—such as a groove provided in the outer circumferential surface of the latching bolt—or a component secured thereto—such as the nut—and prevents the latching bolt from moving out of the extended position. Conversely, when the latching bolt is in the extended position and the locking element is moved from the locking position to the enabling position it no longer prevents the latching bolt from moving from the extended position into the retracted position. The locking element may be or comprise, e.g., a locking pin, or locking element may be or comprise, e.g., a cam element connected to a rotatable shaft, i.e., the locking mechanism then comprises a rotatable shaft with a radially extending projection constituting or forming part of the locking element.

In the above embodiments, in which the latching device comprises one or more locking mechanisms, the locking mechanisms may include hydraulically or electrically powered locking actuator(s) operable to move the locking element from the locking position to the enabling position, and a biasing arrangement, which is arranged and adapted to bias the locking element into the extended position, so that locking is ensured in the case of loss of power for the locking actuator. In particular, the locking actuator may be, e.g., a solenoid, which requires power to effect this movement of the at least one locking element. For reasons of redundancy each locking mechanism may comprise two of these locking actuators, which are adapted to independently effect the above movement or movements of the locking element. It is further if each of the locking mechanisms is configured such that the locking actuators can be switched between a mode of operation, in which they actively move the locking element from the locking position to the enabling position against the biasing force of the biasing arrangement, and a further mode of operation, in which the locking element is free to be move by the biasing arrangement towards the locking position but the locking actuator or a separate detector detects the position of the locking element. For example, in case the locking actuator is a solenoid, in the latter mode of operation the current through the solenoid may be utilized as a measure of the position of the locking element. In any case, this configuration has the advantage that an error detection function is provided for in a simple manner. More specifically, after the locking element has been actively moved by means of the locking actuator from the locking position to the enabling position and the latch actuator has started moving latching bolt out of the extended position, the locking actuator may be switched into the measuring mode, such that the biasing arrangement biases the locking element against an outer surface of the latching bolt. Thus, the locking element is prevented from moving into the locking position by the abutment against the latching bolt upon further movement of the latching bolt during which the locking element may slide on the outer surface of the latching bolt. However, in case the latching bolt is broken, the locking element may move into the locking position, which is detected by the measurement of its position and indicates an error.

In an embodiment, the end portion of the latching bolt opposite the nut is chamfered. This configuration facilitates insertion of the latching bolt into the first and second bores of the first and second engagement portions of the wing arrangement.

In an embodiment, the latching device further comprises a mounting arrangement which is adapted to fixedly mount the housing to a surface in a defined orientation with the opening facing the surface. Thus, the housing can be mounted by means of the mounting arrangement to a surface of the first engagement portion or second engagement portion of the wing arrangement of an aircraft such that the opening is aligned with the first and second bores when the tip section is in the deployed position. For example, the mounting arrangement may comprise a flange portion of the housing in which at least two bores and/or at least two bolts or dowels are provided for bolting or fixing the housing to the surface in a predetermined orientation.

In accordance with the purpose of the above-described latching device, one or more of the latching devices may be part of a wing arrangement for an aircraft. The wing arrangement is of the construction already described in detail above. Thus, to summarize briefly, it comprises a wing comprising a base section having a first end portion adapted to be secured to the fuselage of an aircraft and an opposite second end portion, and a tip section having a third end portion and an opposite fourth end portion, wherein the third end portion is pivotably connected to the second end portion such that the tip section is pivotable about a pivot axis between a deployed position and a stowed position in which the distance between the first end portion and the fourth end portion is smaller than in the deployed position. The wing arrangement also comprises one or more first engagement portions, each having a first bore and extending from the base section at the second end portion, and one or more second engagement portions, each having a second bore and extending from the tip section at the third end portion, wherein the first and second engagement portions are associated in pairs, such that when the tip section is in the deployed position the first and second bores of each of the pairs of first and second engagement portions are aligned and when the tip section is in the folded position the first and second bores are out of alignment. For further details, reference is made to the above extensive explanations.

Each of the one or more latching devices is associated with one of the pairs of first and second engagement portions. For each of the one or more latching device the diameter of the latching bolt matches the diameter of the first and second bores of the associated pair, and the housing is fixedly mounted by means of the mounting arrangement to a surface of the first engagement portion or of the second engagement portion of the pair such that the opening is aligned with the first and second bores when the tip section is in the deployed position. The alignment is such that in the deployed position of the tip section the first and second bores are aligned with the latching bolt such that the latching bolt is movable into engagement with the first and second bores by moving it into the extended position and out of engagement with the first and second bores by moving it into the retracted position, wherein when the latching bolt is in engagement with the first and second bores it prevents movement of the tip section out of the deployed position.

In an embodiment of the wing arrangement each of the first engagement portions comprises multiple first lugs, through which the first bore extends, and each of the second engagement portions comprises multiple second lugs, through which the second bore extends, wherein in the deployed position the first and second lugs of the associated first and second engagement portions interengage such that at least one second lug is disposed between each pair of adjacent first lugs.

In an embodiment, the surface to which the housing is fixedly mounted is a lateral surface of one of the first and second lugs, in which lateral surface the respective first or second bore is provided, wherein the first or second bore in the respective one of the lugs comprises a bushing for supporting the latching bolt against radial movement. In this manner, once the latching bolt has been extended from the housing to an extent that it is inserted into the bushing, the guiding of the further movement of the latching bolt is not only effected by the guide, but by the combination of the guide and the bushing. During normal operation the latching bolt may never be fully retracted into the housing, i.e. moved into the retracted position, but is only retracted to an extent maintained the tip of the latching bolt in the bushing. This still allows for movement of the tip section out of and into the extended position. Only upon maintenance or removal of the latching device, the latching bolt may be moved into the retracted position.

The wing arrangement according to any of the above-described embodiments may be part of an aircraft. The aircraft further comprises a fuselage, wherein the first end portion of the base section is attached to the fuselage and the base section is arranged between the fuselage and the tip section.

SUMMARY OF DRAWINGS

In the following an exemplary embodiment of the present invention will be explained in detail with reference to the drawings.

FIG. 1a shows a schematic top view of an aircraft for use in which the embodiments of the latching device according to the present invention are adapted.

FIG. 1b shows a top view of a wing arrangement of the aircraft of FIG. 1a.

FIG. 1c is a close-up view of a tip region of a primary wing and a wing tip device attached to the primary wing on the aircraft shown in FIG. 1a.

FIG. 2 shows a partial perspective view of a connection region between two end portions of a base section and a tip section, respectively, of the wing arrangement shown in FIG. 1b.

FIG. 3 shows a schematic perspective view of a latching device according to an embodiment of the present invention.

FIG. 4 shows a cross-sectional view of the latching device of FIG. 3.

DETAILED DESCRIPTION

FIGS. 1a and 1c show schematic top views of an aircraft 1 having two wing arrangements 3 including two or more latching devices according to the present invention (not visible in FIG. 1a). The aircraft 1 also comprises a fuselage 5 extending along a longitudinal axis 7 which corresponds to the x-axis of the aircraft 1. Each of the wing arrangements 3 comprises a wing 9 that extends away from the fuselage 5, and each wing 9 comprises a base section 11 and a tip section 13. The base section 11 has a first or inboard end portion 11a, which is configured or adapted to be coupled to the fuselage 5 and is shown to be coupled to the fuselage 5, and an opposite second or outboard end portion 11b spaced from the fuselage 5 by the remainder of the base section 11.

The tip section 13 of the wing 9 is pivotably connected to the second end portion 11b of the base section 11. More particularly, the tip section 13 extends away from the second or outboard end portion 11b of the base section 11 and comprises a third or inboard end portion 13a and an opposite fourth or outboard end portion 13b spaced from the base section 11 by the remainder of the tip section 13 (as can be seen in the insert of FIG. 1a, which shows an outboard end region of one of the wings 9 in enlarged form). The fourth end portion may be provided by a part of a wing tip device 15, which itself is a part of the tip section 13. The third end portion 13a is pivotably mounted on or coupled to the second end portion 11b of the base section 11 in such a manner that the tip section 13 is able to pivot between a deployed position and a folded or stowed position about a pivot axis 17 (see again also the insert of FIG. 1a).

The pivot axis 17 generally extends in the flight direction of the aircraft.

In the deployed position illustrated in FIG. 1a the tip section 13 extends essentially in the plane of the base section 11, and in the folded position the tip section 13 is angled upwardly with respect to the base section 11, so that the spanwise length of the wing 9 is decreased. Alternatively, with the same effect it may be provided that the tip section 13 is angled downwardly in the folded position. Thus, in the deployed position the fourth end portions or the outermost outboard ends of the tip sections 13 of the wings 9 have a larger distance than in the folded position, so that the wingspan of the aircraft 1 can be selectively decreased by moving the tip sections 13 of the wings 9 from the deployed position into the folded position in order to allow for the use of infrastructure adapted to aircraft of such reduced wingspan and in order to save on airport fees, and increased in order to allow for reduced fuel consumption during flight.

FIG. 1b shows one of the wing arrangements 3 in isolation.

In order to effect the pivotal movement of the tip section 13 between the deployed and the stowed positions, each of the wing arrangements 3 comprises an actuating arrangement, which is not illustrated in the Figures.

As shown in FIG. 2, the pivotable coupling between the base section 11 and the tip section 13 may advantageously include two pairs of brackets 19a, 19b, wherein the bracket 19a of each pair is fixedly secured to the base section 11 and the bracket 19b of each pair is fixedly secured to the tip section 13. Each of the brackets 19a comprises a plurality of hinge lugs 21a extending from the remainder of the bracket 19a towards the tip section 13, and each of the brackets 19b comprises a plurality of hinge lugs 21b extending from the remainder of the bracket 19b towards the base section 11. The hinge lugs 21a, 21b are plate-shaped and have a bore extending therethrough (not visible in FIG. 2) and are arranged such that for each pair of brackets 19a, 19b one of the hinge lugs 21b is disposed between each adjacent pair of hinge lugs 21a and the bores of the hinge lugs 21a, 21b are aligned with each other, effectively forming a single bore. Inside this single bore of each pair of brackets 19a, 19b a hinge bolt is secured (not visible in FIG. 2), so that the brackets 19a, 19b are secured to each other pivotably about the axis defined by the hinge bolt. The hinge bolts of the pairs of brackets 19a, 19b are aligned with each other to form the pivot axis 17.

In the depth direction of the wing 9, i.e. in FIG. 2 below the pair of brackets 19a, 19b and hinge lugs 19a, 19b, two further pairs of brackets 23a, 23b are provided, which are not visible in FIG. 2, but are visible in FIGS. 3 and 4. The bracket 23a of each pair is fixedly secured to the base section 11 and the bracket 23b of each pair is fixedly secured to the tip section 13. Each of the brackets 23a comprises a plurality of latching lugs 25a extending from the remainder of the bracket 23a towards the tip section 13, and each of the brackets 23b comprises a plurality of latching lugs 25b extending from the remainder of the bracket 23b towards the base section 11. The bracket 23a and lug 25a forms a first engagement portion, and the bracket 23b and lug 25b form a second engagement portion. The latching lugs 25a, 25b are plate-shaped and each have a bore 27a or 27b extending there through and are arranged such that for each pair of brackets 23a, 23b one of the latching lugs 25b is disposed between each adjacent pair of latching lugs 25a and the bores 27a, b of the latching lugs 25a, 25b are aligned with each other, effectively forming a single bore 27a, b, when the tip section 13 is in the deployed position illustrated in FIGS. 2 to 4. This single bore 27a, b is spaced from the pivot axis 17. Consequently, when moving the tip section 13 out of the deployed position towards the folded position the latching lugs 25a are moved away from the latching lugs 25b, so that the bores 27a of the latching lugs 25a are no longer in alignment with the bores 27b of the latching lugs 25b. In order to prevent this and latch the tip section 13 in the deployed position, a latching device 29 is provided for each of the pairs of brackets 23a, 23b.

FIGS. 3 and 4 show a schematic perspective view and a cross-sectional view, respectively, of an embodiment of the latching device 29. The latching device 29 is adapted and capable to latch the tip section 13 against movement with respect to the base section when the tip section 13 is in the deployed position by selectively extending a hollow cylindrical latching bolt 31 through the aligned bores 27a, b of the latching lugs 25a, 25b, and to enable movement of the tip section 13 from the deployed position to the folded position by selectively retracting the latching bolt 31 from the bores 27a, b.

The latching device 29 comprises a housing 33 having an interior cylindrical cavity 35 and an opening 37 at which the cavity 35 is open towards an exterior of the housing 33. Inside the cavity 35 an elongate straight spindle 39 is supported such that it is selectively rotatable in both directions about its longitudinal axis by an electric motor 41 arranged outside the housing and offset from the spindle 39, i.e. an output shaft of the electric motor 41 is parallel to and offset from the spindle 39. One of the end portions 39a of the spindle 39 is rotatably supported in a cover 43 of the housing 33, which cover 43 closes the cavity 35 at the axial end opposite the opening 37, such that axial movement of the spindle 39 is prevented. The output shaft of the electric motor 41 is drivingly coupled via a planar transmission 45 to the end portion 39a of the spindle 39. This coupling may be effected via a universal joint, so that the spindle 39 may still be rotated reliably by the electric motor 41 if the longitudinal axis of the spindle 39 deviates from the longitudinal axis of the cylindrical interior cavity 35.

The latching device 29 further comprises a ball nut 47 to which one end of the latching bolt 31 is rigidly but releasably coupled. The coupling between the spindle 39 and the latching bolt 31 likewise may include a universal joint. The ball nut 47 is supported such that it is not able to rotate with respect to the housing 33, so that upon rotation of the spindle 39 the ball nut 47 moves along the spindle 39 in a direction determined by the direction of rotation of the spindle 39. The latching bolt 31 moves together with the ball nut 47, so that by operating the electric motor 41 the latching bolt 31 can be selectively extended from the opening 37 of the housing 33 into the extended positon shown in FIG. 4 and retracted into the interior cavity 35 and out of the bores 27 a, b of the latching lugs 25a, 25b. During normal operation, the latching bolt 31 may only retracted to an extent that the end portion 39b of the spindle 39 opposite the end portion 39a is still inside the bore 27a, b of the latching lug 25 closest to the latching device 29, thereby providing a bushing for the spindle 39 improving guiding. In order to facilitate insertion of the latching bolt 31 into the bore 27a, b the end portion of the spindle 39 opposite the ball nut 47 may be chamfered.

In order to guide the movement of the ball nut 47 along the spindle 39 and of the latching bolt 31 between the retracted position and the extended position, a hollow cylindrical guide 49 is disposed inside the cavity 35. The guide 49 comprises elongate slots 51 extending along the longitudinal axis of the guide 49, and the ball nut 47 comprises radially extending projections 53 extending into the slots 51, thereby allowing the guide 49 to prevent rotation of the ball nut 47 with respect to the guide 49 and the housing 33 and guiding linear movement of the ball nut 47 along the spindle 39. An interior cylindrical wall of the guide 49 or a linear ball bearing provided in this wall may contact the outer circumferential surface of the latching bolt 31, at least when it is not in the fully extended position, thereby guiding the movement of the latching bolt 31, in combination with the bushing provided by the bore 27a, b in the latching lug 25b closest to the latching device 29.

In order to be able to safely secure the latching bolt 31 in the extended position latching the tip section 13 in the deployed position, the latching device 29 further comprises a locking mechanism 55 having a locking pin 57 which is selectively movable between a locking position and an enabling position. When the latching bolt 31 is in the extended position shown in FIG. 4 and the locking pin 47 is moved from the enabling position to the locking position the locking pin 57 engages a circumferential groove 59 of the latching bolt 31 and prevents the latching bolt 31 from moving out of the extended position. When the latching bolt 31 is in the extended position and the locking pin 57 is moved from the locking position to the enabling position the latching bolt 31, the locking pin 57 disengages from the groove 59 and is therefore able to move from the extended position into the retracted position. The locking mechanism 55 comprises a locking actuator operable to move the locking pin 57 from the locking position to the enabling position, and a biasing arrangement, which is arranged and adapted to bias the locking pin 57 into the extended position.

The latching device 29 is mounted to the surface of the latching lug 25b closest to the latching device 29 such that the opening 37 is axially aligned with the bore 27a, b in the latching lug 25b. This mounting is effected by a flange 61 of the housing 33 in which bores 63 are provided, so that the entire latching device 29 can be easily secured to the latching lug 25b in a predetermined orientation and arrangement by means of bolts extending through the bores 63 and corresponding bores in the latching lug 25b. The flange 61 and bores 63 form a mounting arrangement.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A latching device for a wing arrangement for an aircraft, wherein the wing arrangement includes a wing comprising a base section having a first end portion adapted to be secured to a fuselage of an aircraft and an opposite second end portion, and a tip section having a third end portion and an opposite fourth end portion, wherein the third end portion is pivotably connected to the second end portion such that the tip section is pivotable about a pivot axis between a deployed position and a stowed position in which a spanwise length of the wing is smaller than in the deployed position, wherein a first engagement portion having a first bore extends from the base section at the second end portion and a second engagement portion having a second bore extends from the tip section at the third end portion such that when the tip section is in the deployed position the first and second bores are aligned and when the tip section is in a folded position the first and second bores are out of alignment, and wherein the latching device comprises:

a housing comprising an interior cavity, an opening at which the interior cavity is open towards an exterior of the housing, and a cover at an axial end of the housing opposite to the opening, wherein the cover closes the cavity and the cover includes a cover cavity within the cover and open to the interior cavity, an elongate spindle which is externally threaded and supported in the interior cavity such that the elongate spindle is rotatable about a longitudinal axis of the elongate spindle and is secured against axial movement with respect to the housing, wherein an end portion of the spindle is in the cover cavity and rotatably supported by the cover, a nut threaded onto the elongate spindle and supported in the housing such that rotation of the nut with respect to the housing is prevented and rotation of the elongate spindle causes the nut to move along the elongate spindle, a latching bolt coupled to the nut and slidably supported in the housing, such that the latching bolt is selectively movable along the longitudinal axis of the elongate spindle between a retracted position and an extended position by moving the nut along the elongate spindle, wherein in the extended position the latching bolt extends further through the opening to the exterior of the housing than in the retracted position, a guide adapted to guide movement of the nut along the elongate spindle and of the latching bolt between the retracted position and the extended position, and a latch actuator adapted to effect rotation of the elongate spindle about the longitudinal axis and movement of the latching bolt between the extended and retracted positions.

2. The latching device according to claim 1, wherein the nut is a ball nut.

3. The latching device according to claim 1, wherein the latching bolt is releasably coupled to the nut and/or wherein the latching bolt is rigidly coupled to the nut.

4. The latching device according to claim 1, wherein the latching bolt includes a hollow cylinder.

5. The latching device according to claim 1, wherein at least a portion of the guide is a hollow cylinder, and wherein the latching bolt and the nut are in contact with an interior surface of the guide.

6. The latching device according to claim 1, wherein the nut comprises one of a slot and a radial projection and the guide comprises the other one of the slot and the radial projection, and wherein the slot and the radial projection engage each other and are configured to prevent relative rotation between the nut and the housing and to guide movement of the nut along the spindle.

7. The latching device according to claim 1, wherein the latch actuator comprises an electric, hydraulic or pneumatic actuator, and the latch actuator is drivingly coupled to the end portion of the spindle by a transmission in the cover cavity.

8. The latching device according to claim 1, further comprising at least one locking mechanism having a locking element which is selectively movable between a locking position and an enabling position, wherein, when the latching bolt is in the extended position and the locking element is moved from the enabling position to the locking position, the locking element engages the latching bolt or a component secured to the latching bolt, and prevents the latching bolt from moving out of the extended position, and wherein, when the latching bolt is in the extended position and the locking element is moved from the locking position to the enabling position, the latching bolt configured to move from the extended position into the retracted position.

9. The latching device according to claim 8, wherein the at least one locking mechanism further comprises a locking actuator operable to move the at least one locking element from the locking position to the enabling position, and a biasing arrangement, which is arranged and adapted to bias the locking element into the locking position.

10. The latching device according to claim 1, wherein an end portion of the latching bolt opposite the nut is chamfered.

11. The latching device according to claim 1, further comprising a mounting arrangement adapted to fixedly mount the housing to a surface in a defined orientation with the opening facing the surface, such that the housing is mounted by the mounting arrangement to the surface of the first engagement portion or second engagement portion of the wing arrangement of the aircraft such that the opening is aligned with the first and second bores when the tip section is in the deployed position.

12. A wing arrangement for an aircraft comprising:

a wing including a base section having a first end portion adapted to be secured to a fuselage of an aircraft and an opposite second end portion, and a tip section including a third end portion and an opposite fourth end portion, wherein the third end portion is pivotably connected to the second end portion such that the tip section is pivotable about a pivot axis between a deployed position and a stowed position in which the distance between the first end portion and the fourth end portion is smaller than in the deployed position, wherein a first engagement portion having a first bore extends from the base section at the second end portion and a second engagement portion having a second bore extends from the tip section at the third end portion such that when the tip section is in the deployed position the first and second bores are aligned and when the tip section is in the folded position the first and second bores are out of alignment, at least one latching device comprising:

a housing comprising an interior cavity, an opening at which the interior cavity is open towards an exterior of the housing, wherein the housing includes a cover at an axial end of the housing opposite to the opening, the cover closes the cavity and the cover includes a cover cavity within the cover and open to the interior cavity;

an elongate spindle which is externally threaded and supported in the interior cavity such that the elongate spindle is rotatable about a longitudinal axis of the elongate spindle and is secured against axial movement with respect to the housing, wherein an end portion of the spindle is in the cover cavity and rotatably supported in a cover of the housing, a nut threaded onto the elongate spindle and supported in the housing such that rotation of the nut with respect to the housing is prevented and rotation of the elongate spindle causes the nut to move along the elongate spindle, a latching bolt coupled to the nut and slidably supported in the housing, such that the latching bolt is selectively movable along the longitudinal axis of the elongate spindle between a retracted position and an extended position by moving the nut along the elongate spindle, wherein in the extended position the latching bolt extends further through the opening to the exterior of the housing than in the retracted position, wherein a diameter of the latching bolt matches a diameter of the first and second bores a guide adapted to guide movement of the nut along the elongate spindle and of the latching bolt between the retracted position and the extended position, and a latch actuator adapted to effect rotation of the elongate spindle about the longitudinal axis and movement of the latching bolt between the extended and retracted positions, and a mounting arranged configured to fixedly mount the housing to a surface of the first engagement portion or of the second engagement portion such that the opening of the housing is aligned with the first and second bores when the tip section is in the deployed position, so that in the deployed position of the tip section the first and second bores are aligned with the latching bolt such that the latching bolt is movable:

into engagement with the first bore and the second bore by moving the first bore and the second bore into the extended position, and out of engagement with the first and second bores by moving the latching bolt into the retracted position, wherein when the latching bolt is in engagement with the first and second bores the latching bolt prevents movement of the tip section out of the deployed position.

13. The wing arrangement according to claim 11, wherein the first engagement portion comprises multiple first lugs, through which the first bore extends, and the second engagement portion comprises multiple second lugs, through which the second bore extends, wherein in the deployed position the first and second lugs inter-engage such that at least one second lug is disposed between each pair of adjacent first lugs.

14. The wing arrangement according to claim 11, wherein the surface to which the housing is fixedly mounted is a lateral surface of one of the first and second lugs, in which lateral surface the respective first or second bore is provided, wherein the first or second bore in the respective one of the lugs comprises a bushing for supporting the latching bolt against radial movement.

15. An aircraft assembly comprising a fuselage of the aircraft, and the wing arrangement according to claim 11, wherein the first end portion of the base section is attached to the fuselage and the base section is arranged between the fuselage and the tip section.

16. The wing arrangement according to claim 11, further comprising a transmission in the cover cavity and configured to rotate the spindle, wherein the latch actuator is drivingly coupled to the transmission.

\* \* \* \* \*